Aug. 22, 1967　　D. A. CHRISTENSEN ET AL　　3,336,660

FACE SEALS

Filed Nov. 13, 1962

United States Patent Office 3,336,660
Patented Aug. 22, 1967

3,336,660
FACE SEALS
Dan A. Christensen, Woodside, and Wolfgang A. Kempff, San Mateo, Calif., assignors to Federal-Mogul Corporation, a corporation of Michigan
Filed Nov. 13, 1962, Ser. No. 237,184
4 Claims. (Cl. 29—529)

This invention relates to an improved face seal and to an improved method for manufacturing face seals. In particular, the invention relates to an improved mechanical seal of the face type wherein the face members are constructed from press-formed sheet metal rather than being machined from solid stock of metal, carbon, or other of the materials heretofore used in face seals. The face members of this invention are sheet metal rings with one or more axially extending flanges supporting a radially extending portion which is cupped and is coated with a wear-resistant material and then lapped, ground, or otherwise provided with a sealing face surface.

Mechanical seals of the face type are used to provide a positive fluid seal between a housing and a relatively rotating shaft. Heretofore they have been expensive to manufacture, and their accurate installation has been tedious. One reason why face seals have heretofore been expensive is that the two face elements have heretofore been machined individually, often from two different kinds of materials. Conventionally, one face element has been machined from a thick solid piece of high-grade metal, both the material and machining being expensive. The other face element has conventionally been made from some less rigid material such as bearing metal or brass, or from nonmetallic material such as carbon. This less rigid element was also machined, either from solid bar stock or from specially formed rings, the material and machining again being expensive. The use of a separate metallic supporting member was general with carbon and other non-metallic faces and was often used with metallic faces, the face element being cemented or otherwise secured to the separate supporting member, and this has meant that the supporting members, too, had to be carefully machined at further expense.

The present invention has solved this problem by providing a way in which both face sealing elements may be formed from the same kind of inexpensive sheet metal. Preferably, press-formed sheet steel is formed to provide a flat ring, and the ring is reformed to provide one or more supporting flanges and to impart a desired degree of rigidity to a generally radial portion that will be used to provide the sealing face. In this invention, the radial portion is specially formed to provide an annular cup-like recess, and then a hard coating material is applied in powder form to fore than fill the recess, like a heaping spoonful. The cup-like recess thus enables the application and retention during treatment of a substantial and controlled amount of coating material. The powdered material is sintered or fused together to form a solid coat which is then lapped, ground, and otherwise treated, as will be described. This makes it possible to save a great deal of money in the manufacture of face seals, since only the coating material is costly and comparatively little of it is used.

Other objects and advantages of the invention will appear from the following description of a preferred form thereof.

Figure 3:
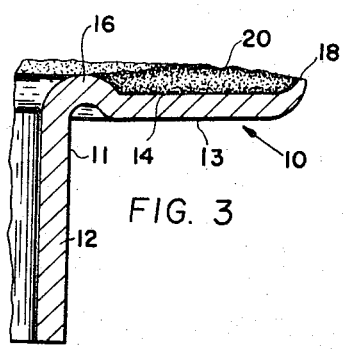
FIG. 3 is a view similar to FIG. 2 showing the face seal element at an early stage of manufacture in which the powdered metal is heaped into an annular cup-like channel of the face seal element's radial face.
Figure 2:
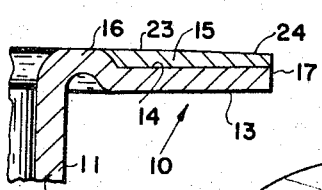
FIG. 2 is an enlarged fragmentary view in section taken along the line 2—2 in FIG. 1.
Figure 1:
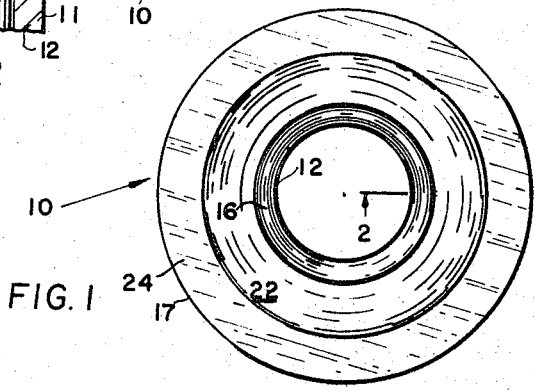
FIG. 1 is a view in end elevation of a face seal element embodying the principles of the invention.

The face element 10 shown in FIGS. 1 and 2 comprises a supporting sheet metal member 11 having an axially extending portion 12 and a radially extending portion 13 with a recess 14. As shown in the drawings, the included angle between the portions 12 and 13 is slightly greater than a right angle. A very hard coating material 15 fills the recess 14, extending from an inner annular ridge 16 to the outer edge 17 of the portion 13. The material 15 is lapped to form a sealing face. The supporting member 11 is made from sheet metal, as by punching out a flat annulus from a sheet and (either in the same operation or in a separate operation) forming it to provide a suitable axial flange 12 and a pair of inner and outer annular ridges 16 and 18 as shown in FIG. 3, with the cup-like channel or recess 14 in between them. At the same time the portion 13 may be generally dished inwardly, so that it meets the flange 12 at an included angle of slightly more than 90°.

The channel 14 (see FIG. 3) is then filled, preferably heaped, with a suitable powdered material 20, which may be applied by hand, by a loading press, or by spraying. Such alloy metals as nickel, iron or cobalt base powders may be used, or tungsten carbide material may be applied in a base matrix. Examples of such powders are as follows:

(1) Nickel base (2.5% Fe, 16% Cr, 4% Si, 4% B, 3% Cu, 3% Mo, balance nickel).
(2) Nickel base (4% Fe, 17% Cr, 4% Si, 3½% B, balance Ni).
(3) Tungsten carbide intimately mixed with a nickel base alloy or other suitable material (e.g., 80% WC, remainder Cr, B, Si, and Ni).
(4) Iron base (1.5% C, 1% Si, 2% Mn, 5% Cr, 2% Ni, 20% Co, 2% Mo, 2% Cu, 3¼% B, balance Fe).
(5) Cobalt base (.6% Fe, 4% B, 1.25% Si, .5% Ni, .15% Cr, balance Co).

The cup-like channel 14 serves to confine and support the powdered material 20, the ridges 16 and 18 enabling a substantial depth to be put on evenly over the portion 13. Excess material that spills over the edges of the channel 14 is readily recovered, giving substantial savings in material, for it can be used on the next seal. The channel 14 also serves to restrain the material 20 when it becomes flowable as a result of heating it to fuse or sinter it. If desired, such material as tungsten carbide and other refractories can be applied into the channel 14 by using a plasma torch, the cup-like channel 14 confining the applied material and enabling the build-up of a relatively uniform coating of substantial thickness.

The powdered materials can be chosen to give desired characteristics to the sealing surface of the face seal face. The characteristics may be high hardness, wear and abrasion resistance, high and low temperature resistance, low friction and dry run ability. By itself, the sheet metal supporting material comprising the member 11 does not have the structural rigidity required of a face seal face. On the other hand, the coating materials once fused tend to be too brittle to be usable as a supporting member; moreover, if not confined by a channel 14 they tend to melt and run away when they are fused. The high temperature refractories like tungsten carbide, due to their extremely high melting point, cannot be appiled economically other than by such special application as by a plasma flame torch.

Figure 4:
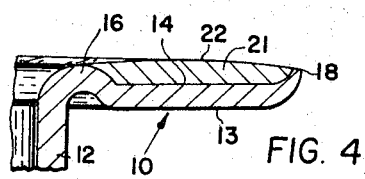
FIG. 4 is a view similar to FIG. 3 showing the same element after the metal powder has been fused and sintered together.

The powdered material 20 may be fused at approximately 1800 to 2100° F. in a controlled-atmosphere furnace, and the fused or sintered material 21 may resemble the shape shown in FIG. 4 where there is usually a slightly convex surface or crown 22 which may be somewhat uneven, since it will be finished by lapping, anyway.

Figure 5:
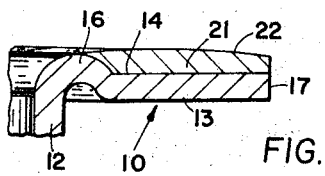
FIG. 5 is a view of the same element with the outer periphery ground or machined off.
Figure 6:
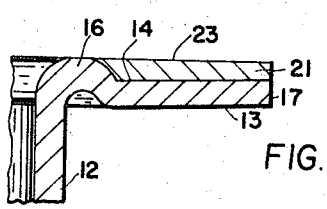
FIG. 6 is a view of the same element after an initial stage of lapping and prior to the final stage of lapping shown in FIG. 2.
Figure 7:
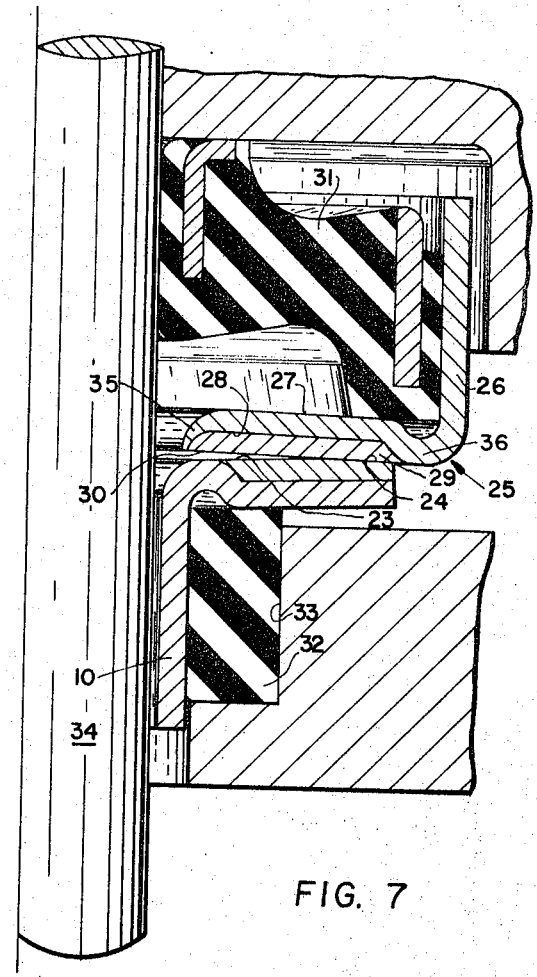
FIG. 7 is a fragmentary view on the scale of FIG. 2 of a section of a complete face seal of a type embodying the present invention using two elements made according to the invention; namely, the one shown in FIGS. 1 through 6, and an opposing element made similarly but without removing either lip or the cup-like recess.

With the coating fused as in FIG. 4, one step which applies to some but not all face elements is to remove the outer peripheral ridge 18, as by machining or grinding, to form the edge 17, as in FIG. 5. (When the reverse type of element 25 is used, as shown in FIG. 7, this need not always be done.) Then the coating material 21 is preferably lapped to provide a surface 23 that is slightly concave; for example, it may be lapped on a six foot radius, care having been taken to put in enough material 21 so that very little of the supporting ridge 16 is lapped off. This first lapping operation (FIG. 6) is followed by a subsequent additional lapping about a much greater radius so that an outer surface 24 that is very nearly plane is achieved.

In FIG. 7, an installation is shown in which a face seal element 10 is employed in conjunction with a similar face seal element 25. The element 25 has an axially extending cylindrical portion 26 and a generally radial portion 27 that does not quite lie at a right angle to the axis, the included angle between the portions 26 and 27 being very slightly less than a right angle. The portion 27 is cupped to provide a recess 28 that is filled with coating material 29 which has been fused and lapped concavely to provide a sealing surface 30. Neither peripheral portion 35, 36 defining the cup-like recess 28 need be cut off. The faces 24 and 30 engage to form the seal, but there is no engagement of the supporting metal portions due to the angular disposition of the elements and to the removal of the portion 18. The element 25 is maintained in place by what is known as a "shear sandwich" 31, such as shown in U.S. patent application Ser. No. 150,276, filed Nov. 6, 1961, now Patent No. 3,185,488, and described there. The element 10 may be retained and backed up by an elastomeric ring 32 held in a bore 33 around a shaft 34. Various configurations of bores, etc., may be used without affecting the principles of the present invention.

Figure 8:
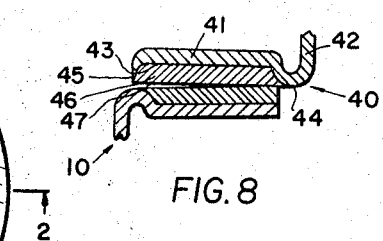
FIG. 8 is a fragmentary view of a portion of a face seal generally like that of FIG. 7 but with a modified form of face arrangement.

FIG. 8 shows a face seal assembly using the element 10 in conjunction with a face seal element 40 which is like the element 25 except that it has a truly radial portion 41 backed up by an axial flange 42. It has a cup-like recess 43 between rims 44 and 45, is filled with material 46 like the material 15 and is lapped flat to a planar surface 47.

To those skilled in the art to which this invention relates, many additional changes in construction and widely differing embodiments of the invention will suggest themselves without departing from the spirit and scope of the invention as defined in the claims.

What is claimed is:

1. A method of making a face sealing member from a sheet metal annulus comprising the steps of:
   punching a flat annulus from sheet metal,
   forming said annulus to provide a cylindrical portion and a generally radial portion having inner and outer annular rims defining a cup-like recessed channel between them,
   filling said channel with a powdered hard coating material and bonding said material to said sheet metal,
   lapping said material to provide a desired sealing surface contour.

2. A method of making a face sealing member from a sheet metal annulus comprising the steps of:
   punching a flat annulus from sheet metal,
   forming said annulus to provide a cylindrical portion and a generally radial portion having inner and outer annular rims defining a recessed channel between them,
   filling said channel with an excess of hard coating material in powder form, and
   fusing said material into a hard coating bonded to said sheet metal, and
   lapping said fused material to provide a desired sealing surface contour.

3. A method of making a face sealing member from a sheet metal annulus comprising the steps of:
   punching a flat annulus from sheet metal,
   forming said annulus to provide a cylindrical portion and a generally radial portion meeting said cylindrical portion at an angle that is slightly different from a right angle, said radial portion having inner and outer annular rims defining a recessed channel between them,
   filling said channel with an excess of powdered hard coating material,
   fusing said material to provide a hard coating bonded to said sheet metal, and
   lapping said fused material to provide a desired sealing surface contour.

4. A method of making a face sealing member from sheet metal comprising the steps of:
   punching out an annulus from a sheet of sheet metal,
   forming said annulus to provide an inner cylindrical portion and a generally radial portion having inner and outer annular rims defining a recessed channel therebetween,
   filling said channel with an excess of hard metal coating material,
   fusing said metal into solid form while bonding it to said generally radial portion,
   removing said outer annular rim,
   lapping said fused material about a first center on the axis of said annulus without removing a substantial amount of said inner rim, and
   lapping an outer marginal portion about a second center coaxial with said first center but at a radius much greater.

References Cited

UNITED STATES PATENTS

| 2,425,209 | 8/1947 | Snyder et al. | 277—96 |
| 2,884,693 | 5/1959 | Wagner | 29—529 |
| 3,086,782 | 4/1963 | Peickii et al. | 277—92 |
| 3,108,370 | 10/1963 | Peickii et al. | 29—529 |
| 3,198,182 | 8/1965 | Robinson et al. | 29—156.7 |

JOHN F. CAMPBELL, *Primary Examiner.*

S. ROTHBERG, *Examiner.*

P. M. COHEN, E. DOWNS, *Assistant Examiners.*